United States Patent [19]

Letten et al.

[11] 3,713,144
[45] Jan. 23, 1973

[54] PHASE SIGNATURE RADAR

[75] Inventors: Carlyle J. Letten, Acton, Mass.; William B. Goggins, Jr., Winchester, Mass.

[73] Assignee: The United States of America as represented by the Secretary of the Air Force

[22] Filed: Nov. 22, 1968

[21] Appl. No.: 784,990

[52] U.S. Cl. .............343/5 R, 343/17.2 R, 343/17.5
[51] Int. Cl. ..................................................G01s 9/02
[58] Field of Search....343/5 R, 10, 12, 13 R, 17.2 R, 343/17.5, 100 CL

[56] References Cited

UNITED STATES PATENTS

| | | | |
|---|---|---|---|
| 3,110,897 | 11/1963 | Laurent | 343/17.5 X |
| 2,817,834 | 12/1957 | Russo et al. | 343/13 |
| 3,165,739 | 1/1965 | Long et al. | 343/13 |
| 3,270,315 | 8/1966 | Parks | 343/13 X |

Primary Examiner—T. H. Tubbesing
Attorney—Harry A. Herbert, Jr. and George Fine

[57] ABSTRACT

A radar method and system of distinguishing radar echoes of discrete and point targets such as moving and motionless aircraft, trucks, etc., from reflections from distributed targets such as the earth's surface, the radar echoes resulting from a succession of single pulses transmitted from a single antenna. The electrical phase within the returning radar echoes is measured by means of a coherent CW oscillator operating at the frequency of the transmitted radar signal. The measurement of phase as a function of time results in a fixed or stationary phase measurement for point targets distinguishable from the variable phase changes corresponding to distributed or multiple targets.

3 Claims, 2 Drawing Figures

PATENTED JAN 23 1973  3,713,144

INVENTORS
CARLYLE J. SLETTEN
WILLIAM B. GOGGINS Jr.
BY Harry C. Herbert Jr.
George Fine
ATTORNEYS

PHASE SIGNATURE RADAR

BACKGROUND OF THE INVENTION

The present invention relates to radar systems and methods and more particularly a phase signature radar based on phase measurements in the time stream of radar pulses.

The prior art provided a radar which included the transmission of a multipulse signal, an antenna system which permitted extracting the phase relation between the reflected signals arriving at the antenna thereby creating sum and difference signals, an offset oscillator which provided single sideband reception, and a circuit which provided a comparison of the sum and difference signals instantantaneous amplitude. For example, in the United States Patent entitled "Phase-Comparison Monopulse Radar" issued Jan. 26, 1965 bearing the U.S. Pat. No. 3,167,765, there is provided a radar including an antenna system consisting of two paraboloids with their feed centers at the same elevation and displaced in azimuth to provide phase comparison of the reflected sum and difference signals. The transmitted signal is preferably in the form of two pulses which are of equal length and are separated by a time interval equal to that of one of the pulses. The signals reflected from the targets to the antenna system are divided in accordance with their instantaneous RF phase into sum and difference signals. The $\Sigma$ and $\Delta$ signals are separately combined with the output of a local oscillator which is offset to provide single side band reception. These signals are thereafter separately amplified in IF amplifiers set for a relatively narrow band pass, are separately detected, and are compared to provide a resultant sum or difference which is indicative of the divergence of the electrical axis of the antenna system from the target. It is further noted that in the prior art there is also provided means for receiving return echoes which include a pair of reflected signal sensors in which one of the sensors is displaced from the other as in the United States Patent bearing the U.S. Pat. No. 3,273,148 issued Sept. 13, 1966.

The present invention provides a radar method and system which is based on phase measurements in the time stream of radar pulses. A succession of single pulses are directed to the target of interest by a single antenna and the identical single antenna is utilized for the reception of the return echoes from the target of interest. It is emphasized that the prior art has a pair of transmitting antennas, one displaced from the other and/or a pair of receiving means, one displaced from the other in order to achieve the desired results.

SUMMARY OF THE INVENTION

A phase signature radar is provided which is based on phase measurements in the time stream of radar pulses. Radar echoes from discrete or point targets are distinguished from reflections from distributed targets such as the earth's surface. The electrical phase within the returning radar echoes is measured by means of a coherent oscillator operating at the frequency of the transmitted radar pulses. The measurement of phase as a function of time results in a fixed or stationary phase measurement for point targets distinguishable from the variable phase changes corresponding to distributed or multiple targets.

Some of the features of this invention are comprised of extraction of target identifying data by means of phase comparison using wide bandwidth data processing circuits which test the phase stability in the received pulses and make use of coherent phase jumps or discontinuities to excite lower side band (lower frequencies in the region of $\omega/2$) within the receiver to determine periodicities in extended radar targets.

Unlike MTI which preserves both amplitude and phase variations in echoes for subsequent cancellations, the phase signature technique and system requires broadband phase-changeless limiting to discard completely amplitude variations. Also, unlike MTI (Moving Target Indication) radars a point target can be distinguished from background without any motion of the target relative to the background.

The present invention permits the detection and recognition of point targets such as aircraft, trucks, etc., to be distinguished from echoes from returns from rough surfaces, water surfaces, wooded regions and like multiple echoes. The invention can be used to filter out distributed targets from radar displays, thus increasing visibility of targets of interest. The invention also permits assessment of regular features of distributed targets such as waves in water or spacing of large trees in forest areas. Still further, the radar operator can adjust radar frequency to reduce clutter reflections.

In the accompanying specification we shall describe, and in the annexed drawings show what is at present considered a preferred embodiment of our present invention. It is, however, to be clearly understood that we do not wish to be limited to the exact details herein shown and described as they are for purposes of illustration only, inasmuch as changes therein may be made without the exercise of invention and within the true spirit and scope of the claims appended.

DESCRIPTION OF THE PREFERRED EMBODIMENT

Figure 1:
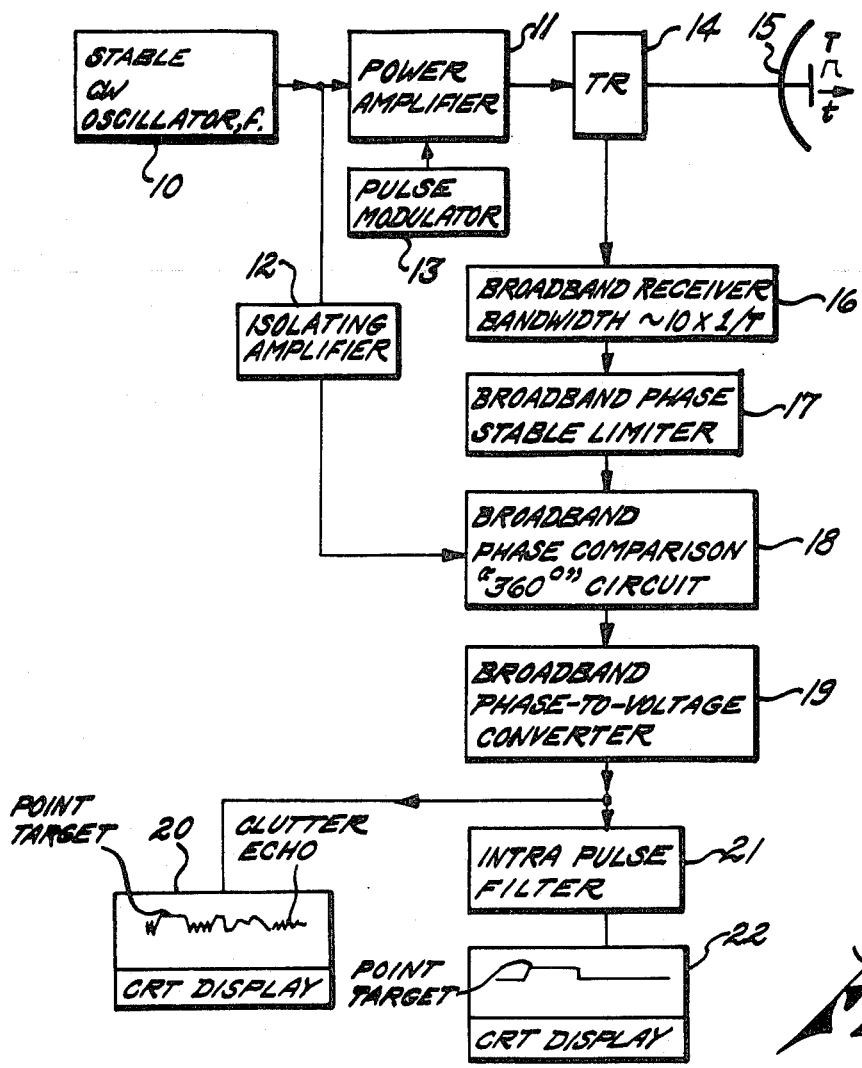
FIG. 1 shows a block diagram of the phase signature radar system utilized to carry out the method of this invention.

Now referring to FIG. 1, there is shown stable CW oscillator 10, which may be a conventional STALO. Stable oscillator 10 provides a CW signal having a preselected frequency, F. The CW signal from oscillator 10 is fed simultaneously to power amplifier 11 and isolating amplifier 12. Power amplifier 11 is designed to be pulsed by pulse modulator 13. The output from power amplifier 11 is a pulse having a predetermined period or $\tau$. The output pulse from power amplifier 11 is transmitted or directed toward the target or targets of interest by way of antenna 15. Antenna 15 receives the pulse to be transmitted by way of transmit-receive device 14.

It is to be noted that a "point" target is $\sim\lambda$ size and a distributed target many $\lambda$. The return echoes from the target of interest are received by antenna 15 and are fed to broadband receiver 16 by way of transmit-receive device 14. Broadband receiver 16 has a bandwidth $\sim 10 \times 1/\tau$. The bandwidth of the receiver must be at least 10 times that required to pass the radar pulse in order to preserve the intrapulse phase structure. The details needed for target identification and filtering out of the clutter or distributed echoes will be lost without this broadband characteristic in the receiving amplifier whereas the slow phase shifts produced by target motions need not sense the vector additions caused by distributed objects entering or leaving the pulse as it passes over the terrain.

Unlike MTI which preserves both amplitude and phase variations in echoes for subsequent cancellations, the phase signature technique requires broadband phase-changeless limiting to discard completely amplitude variations. Later video must not be altered by amplitude of target returns but represent accurately pure phase in the time stream.

The output signal from receiver 16 is passed through broadband phase stable amplitude limiter 17 to broadband phase comparison 360° circuit 18. Phase comparison circuit 18 simultaneously receives the stable CW signal from oscillator 10 by way of isolating amplifier 12.

The resultant signal from phase comparison circuit 18 is received by broadband phase-to-voltage converter 19. Output from the braodband phase comparison or phase measuring circuit is converted to voltage versus time function which uses the phase video varying linearity corresponding to phases from 0° to 360°. The output from phase-to-voltage converter 19 is simultaneously fed to CRT display 20 and intrapulse filter 21. The time constant of intrapulse filter 21 is $\sim \frac{1}{3}\tau$. The output signal from filter 21 is fed to CRT display 22. CRT display 20 shows a point target and clutter echo with clutter echoes recognized and CRT display 22 shows clutter echoes eliminated.

Figure 2:
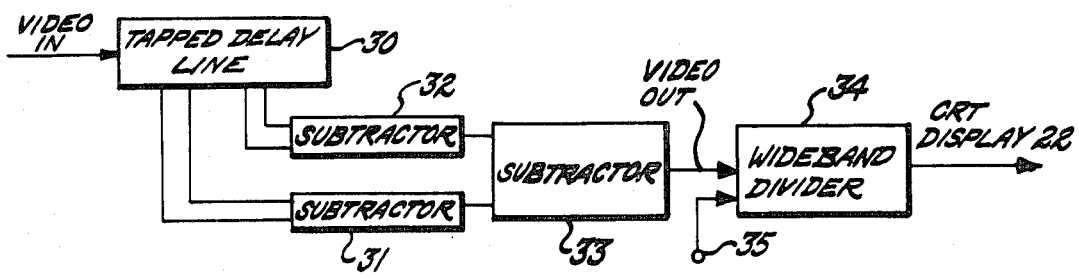
FIG. 2 shows a block diagram of the intrapulse filter of FIG. 1.

Thus, the phase signature information can either be displayed directly on a wide bandwidth cathode-ray tube display to observe and interpret the phase changes in clutter or distributed targets and to recognize the stable voltage (phase) indicative of small localized targets or, an intrapulse video filter with time constant much less than the transmitted pulse width can be used to filter out the clutter or distributed echoes but registering the fixed point targets. This can be accomplished by using a tapped delay line in any one of several ways. One possible way is shown in FIG. 2. The total delay line length of delay line 30 is one pulse width. Taps are located at equal intervals along delay line 30. Each adjacent pair is subtracted by subtractors 31 and 32 and the resultants subtracted by subtractor 33. Four taps are shown but the concept can be extended to more taps. The result is that if the phase is constant within any pulsewidth period the output of the final subtractor will be near zero while if the phase varies during the pulsewidth period some output greater than zero will result. This can then be divided into unity by divider 34 in order to obtain a peaking of constant phase signals. Divider 34 is shown with a second input received from terminal 35 which is a voltage of one. The voltage of one is divided by the first input which is shown as video out from subtractor 33. Thus, CRT display 22 shows a large positive going pulse for a "point" target and the distributed target is minimized or eliminated to provide a clear and positive distinction between "point" and distributed targets.

Of course no delay line canceller is required as in MTI and no motion of the target is required to distinguish it from clutter. Note the additional components — the phase stable broadband limiter, the phase to voltage converter and the low pass video filter are not a part of MTI systems which rely on amplitude as well as phase comparison of delayed signals. The extremely wide bandwidth needed to preserve and recover this signature data is also a distinguishing characteristic of this target signature method.

While in accordance with the provisions of the statutes we have illustrated and described the best form of the invention now known to us, it will be apparent to those skilled in the art that changes may be made in the form of the system disclosed without departing from the spirit of the invention as set forth in the appended claims, and that in some cases certain features of the invention may be used to advantage without a corresponding use of the other features.

We claim:

1. A phase signature radar system for identifying moving and motionless point targets from the background thereof comprising means to generate a stable continuous wave signal having a preselected frequency, means to pulse said generated signal, means to transmit the pulsed signal toward said point targets and the background thereof, means to receive return echoes from said point targets and the background thereof, said transmit and receive means being common, means to limit the amplitude of said received return echoes while maintaining the phase thereof to discard completely amplitude variations, an isolating amplifier connected directly to the output of said stable continuous wave signal generating means, phase comparison means receiving directly and simultaneously the output signal from said amplitude limiting means and said isolating amplifier to provide a resultant phase difference signal serving as a phase signature to distinguish said point targets from the background thereof, means to convert said resultant phase signal to a representative voltage signal, and means to filter said representative voltage signals to pass only signals representative of said point targets.

2. A phase signature radar system as described in claim 1 further including a broadband receiver interconnected between said common receiving means and said amplitude limiting means, said braodband receiver having a preselected bandwidth approximately equal to $10 \times 1/\tau$ with $\tau$ being equal to the period of said pulsed signal to preserve the intrapulse phase structure.

3. A phase signature radar system as described in claim 2 wherein said filter means is limited to a time constant approximately equal to $\frac{1}{3}\tau$ with $\tau$ being equal to the period of said pulsed signal.

* * * * *